(12) United States Patent
Zhu et al.

(10) Patent No.: US 12,291,238 B2
(45) Date of Patent: May 6, 2025

(54) VEHICLE OPERATION SAFETY MODEL GRADE MEASUREMENT

(71) Applicant: Mobileye Vision Technologies Ltd., Jerusalem (IL)

(72) Inventors: Qianying Zhu, Beijing (CN); Lidan Zhang, Beijing (CN); Xiangbin Wu, Beijing (CN); Xinxin Zhang, Beijing (CN); Fei Li, Beijing (CN); Ping Guo, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 173 days.

(21) Appl. No.: 18/037,190

(22) PCT Filed: Nov. 19, 2021

(86) PCT No.: PCT/IB2021/000807
§ 371 (c)(1),
(2) Date: May 16, 2023

(87) PCT Pub. No.: WO2022/106899
PCT Pub. Date: May 27, 2022

(65) Prior Publication Data
US 2023/0406353 A1    Dec. 21, 2023

(30) Foreign Application Priority Data
Nov. 19, 2020 (WO) ............... PCT/CN2020/130249

(51) Int. Cl.
*B60W 60/00* (2020.01)
*B60W 40/02* (2006.01)

(52) U.S. Cl.
CPC ........ *B60W 60/0015* (2020.02); *B60W 40/02* (2013.01); *B60W 2300/00* (2013.01); *B60W 2554/801* (2020.02); *B60W 2554/802* (2020.02)

(58) Field of Classification Search
CPC ............ B60W 60/00; B60W 60/0015; B60W 2554/801; B60W 2554/802; B60W 40/02; B60W 2300/00
(Continued)

(56) References Cited

U.S. PATENT DOCUMENTS 12,036,997 B2 *  7/2024  Zheng ................. B60T 8/17551
12,051,283 B1 *  7/2024  Gataric ................. G07C 5/008
(Continued)

FOREIGN PATENT DOCUMENTS

EP          3309768 B1    2/2020
WO    WO-2022106899 A1    5/2022

OTHER PUBLICATIONS

"International Application Serial No. PCT/IB2021/000807, International Search Report mailed Mar. 18, 222", 2 pgs.
(Continued)

*Primary Examiner* — Andrew Joseph Rudy
(74) *Attorney, Agent, or Firm* — Schwegman Lundberg & Woessner, P.A.

(57) ABSTRACT

System and techniques for vehicle operation safety model (VOSM) grade measurement are described herein. A data set of parameter measurements—defined by the VOSM—of multiple vehicles are obtained. A statistical value is then derived from a portion of the parameter measurements. A measurement from a subject vehicle is obtained that corresponds to the portion of the parameter measurements from
(Continued)

which the statistical value was derived. The measurement is then compared to the statistical value to produce a safety grade for the subject vehicle.

26 Claims, 5 Drawing Sheets

(58) Field of Classification Search
USPC .......................................................... 701/23
See application file for complete search history.

(56) References Cited

U.S. PATENT DOCUMENTS

| 12,084,026 | B2* | 9/2024 | Gaudin | B60W 50/14 |
|---|---|---|---|---|
| 2020/0013244 | A1 | 1/2020 | Rosenbaum | |
| 2024/0255291 | A1* | 8/2024 | Shashua | G01C 21/3841 |

OTHER PUBLICATIONS

"International Application Serial No. PCT/IB2021/000807, Written Opinion mailed Mar. 18, 2022", 6 pgs.
Ciuffo, B, et al., "Safety assurance of Automated Driving Systems. Raising The Level Of Ambition", SIP-adus Workshop 2020, Online. Nov. 12, 2020 [retrieved Feb. 24, 2022] Retrieved from the Internet: <URL:https.7/www.sip-adus.go.jp/evt/workshop2020/file/sa/09SA_05_Ciuffo.pdf>, (Nov. 12, 2020), 1-45.

* cited by examiner

VEHICLE OPERATION SAFETY MODEL GRADE MEASUREMENT

PRIORITY CLAIM

This application is a U.S. National Stage Application under 35 U.S.C. 371 from International Application No. PCT/IB2021/000807, filed Nov. 19, 2021, and published as WO 2022/106899 on May 27, 2022, which claims the benefit of priority to International Application No. PCT/CN2020/130249, filed Nov. 19, 2020, each of which are incorporated herein by reference in their entirety.

TECHNICAL FIELD

Embodiments described herein generally relate to automated driving or driver assisted driving and more specifically to vehicle operation safety model grade measurement by statistical parameter analysis.

BACKGROUND

Autonomous driving and driver assistance systems are becoming more common place. These systems use vehicle sensor data to control, or help control (e.g., via driver prompts, partial steering input, emergency braking, etc.) the vehicle. Autonomous driving systems can fully control the vehicle without driver assistance, whereas assisted driving systems augment a driver's control of the vehicle. Assisted driving systems may be referred to as advanced driver assistance systems (ADAS) systems, developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.—

While autonomous driving and ADAS systems have incorporated various safety features, there is movement to create verifiable safety models for the operation of vehicles. These models tend to formalize the parameters of motion and interaction between vehicles, use those parameters to model vehicle presence in the world, and define acceptable interactions between vehicles based on the vehicle presence. One such vehicle operation safety model (VOSM) is Responsibility-Sensitive Safety (RSS).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 2:
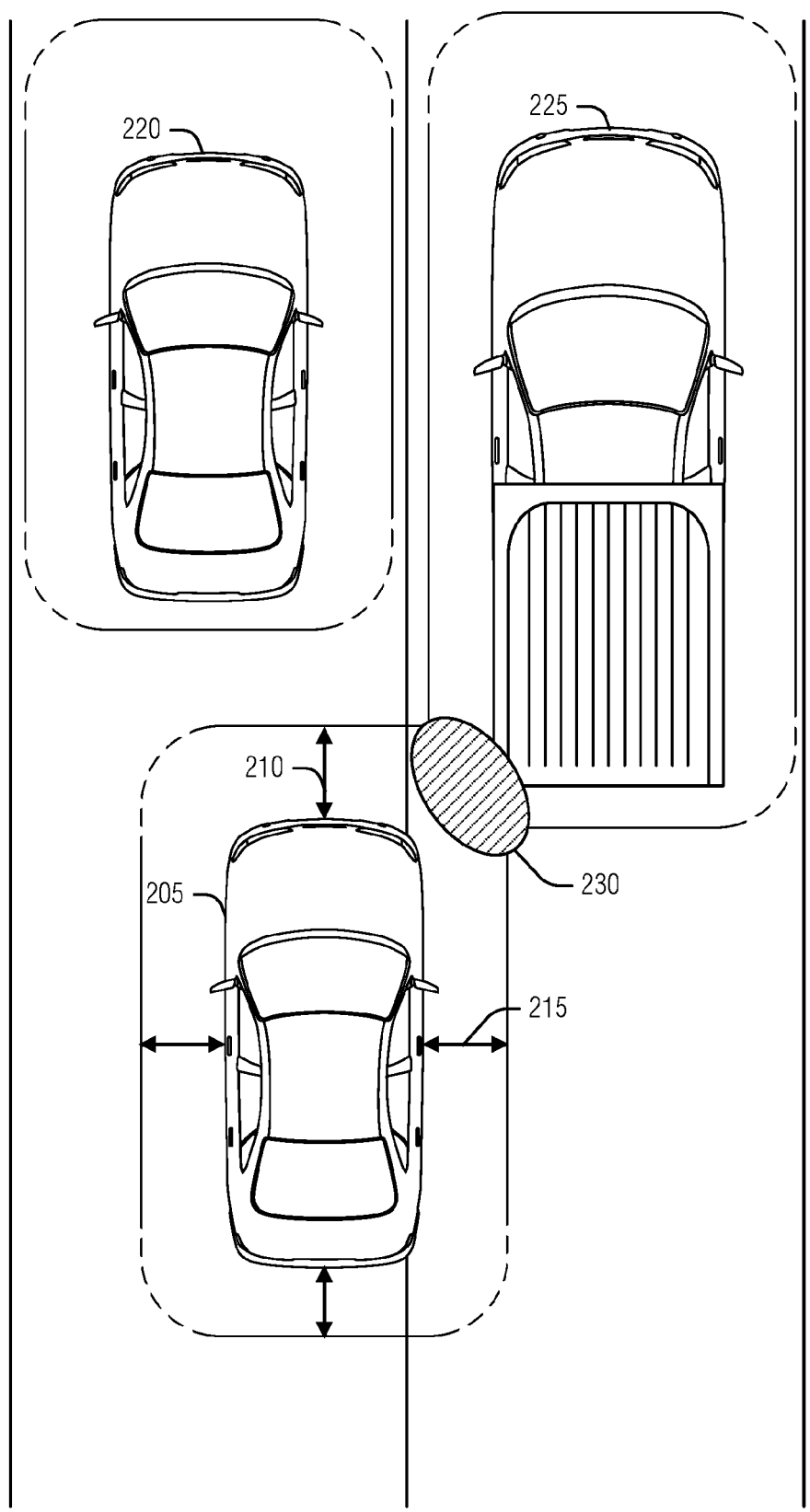
FIG. 2 illustrates an example of a moving vehicle scenario demonstrating an autonomous VOSM, according to an embodiment.

VOSMs, such as RSS, generally define several parameters of individual vehicles and uses these parameters to model a set of distances which determine whether a vehicle is safe or not. Generally, the safe distances address sufficient longitudinal distance and sufficient lateral distance. FIG. 2 illustrates some of these parameters in the context of sufficient (e.g., safe) longitudinal and lateral distances.

Safety judgement, as embodied in VOSMs, is important at each link of the autonomous or assisted driving industry chain. The industry chain may include such actors as the vehicle manufacture, the government, or the insurance industry, among others (e.g., parts suppliers, resellers, etc.) Generally, industry chain actors will evaluate the safety of a vehicle or vehicle systems for cost purposes (e.g., recalls, product liability etc.), regulatory purposes, or coverage purposes (e.g., indemnification by insurance companies, insurance rates, etc.). However, the binary safe or not safe results from current VOSMs is insufficient for the many complex use cases for such safety information about a given vehicle. For example, some vehicles may use conservative driving strategies while others use aggressive strategies. Although both may be considered safe by a VOSM, the conservative strategy may reduce costs in the long run, leading to greater margins for component wear, for example, resulting in greater safety than an aggressive policy when the vehicle is older. Thus, over time, the two strategies may diverge in safety.

To address the nuances that result in different vehicle operating (e.g., driving) strategies, even if all are "safe," a safety grade (e.g., VOSM safety grade) may be used. Here, the safety grade provides the ability to differentiate levels of safety instead of a binary safe or not safe determination. In an example, the safety grade may be represented by a real value ranging from 0 to 1. In an example, higher values indicate safer driving strategies. In an example, a vehicle dataset is collected and statistics (e.g., mean, median, mode, distribution, etc.) are calculated of a given VOSM parameter across many operating vehicles. Then, the same VOSM parameter of a vehicle under evaluation is obtained and compared with the statistics to calculate the safety grade. In an example, the VOSM grade is measured under different modes—e.g., driving conditions or situations such as rain, snow, in the dark, dirt road, etc.—and different vehicle types. Thus, a rich set of safety grades may be produced to inform industry chain actors.

Figure 1:
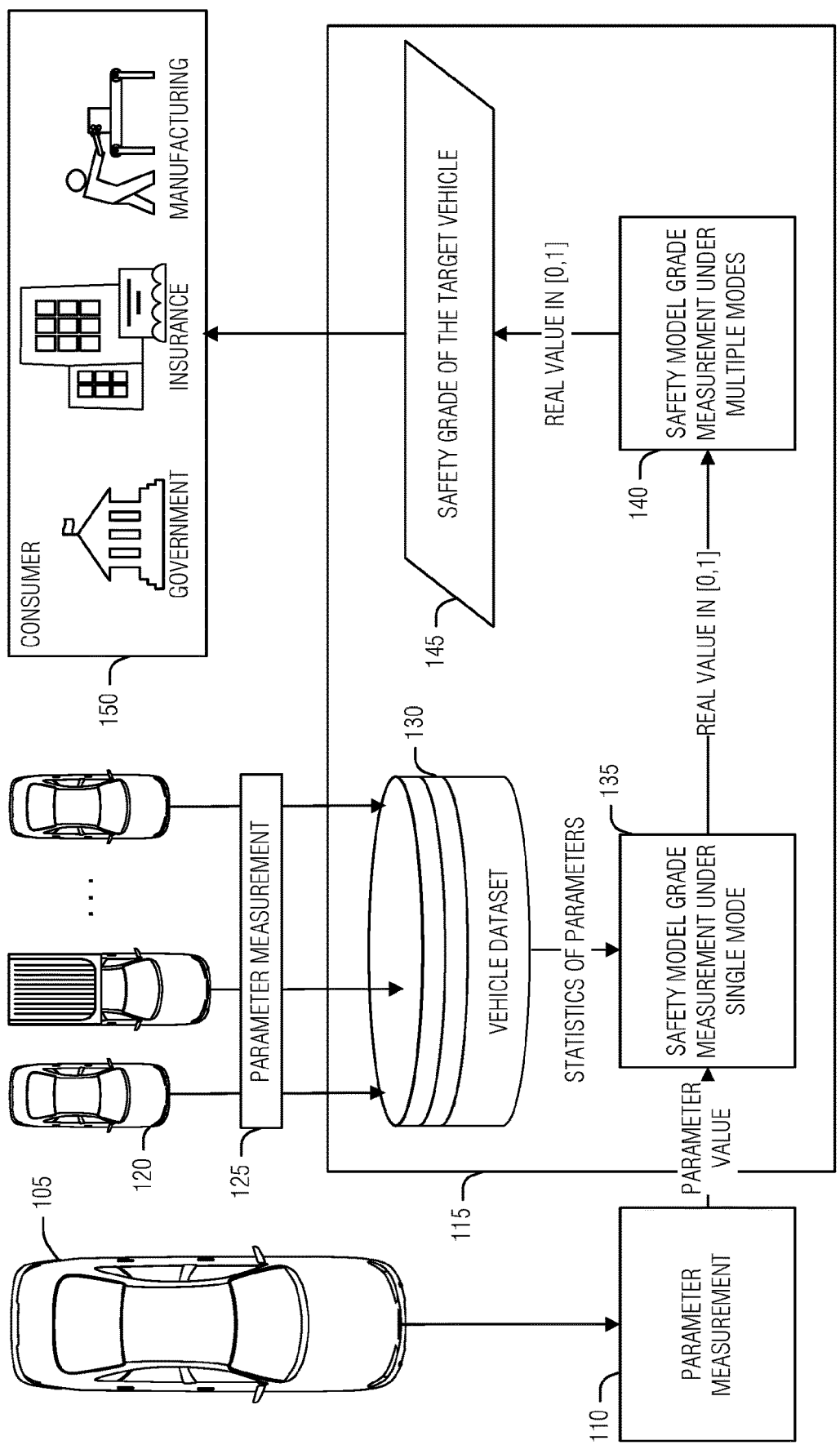
FIG. 1 illustrates an example of a system for VOSM grade measurement, according to an embodiment.

FIG. 1 illustrates an example of a system 115 for VOSM grade measurement, according to an embodiment. The system 115 includes processing circuitry to perform operations and memory to hold running state as well as longer term storage. The system 115 also includes one or more wired or wireless interfaces to obtain (e.g., retrieve or receive) and communicate data, collectively called external interfaces. The system 115 may be implemented in a single device (as illustrated) or across several devices, such as in a cloud computing environment.

The processing circuitry of the system 115 is hardwired, configured by software when in operation, or a combination of the two to produce a VOSM safety grade for a subject vehicle 105. In this capacity, the processing circuitry is configured to obtain a data set of measurements of multiple vehicles 120. In an example, the measurements in the data set are defined by a VOSM. Thus, the measurements are of VOSM parameters 125. The measurements are stored in the memory of the system 115 as the vehicle data set 130. In an example, the vehicle data set 130 includes multiple modes of operation for the multiple vehicles 120. In an example, the modes include weather, time, or density. Here, weather refers to various nature conditions that effect driving for an autonomous vehicle. Such conditions generally involve changes in lighting or obstructions which effect sensor effectiveness or changes in road surface that effect the ability of a vehicle to turn, slow, or stop. In an example, the weather includes clear, overcast, rain, sleet, or snow. Other types of weather that may be considered include fire (e.g., smoke or smog), or even an oil spill on the road surface. In an example, the time includes morning, day, evening, or night. These lighting conditions reflect the different sensor pictures provided to autonomous vehicles as sunlight varies. In an example, the density includes undeveloped, rural, residential, or city. The density modes reflect different architectural features of these areas, such as narrow gravel roads in rural settings as opposed to generally large, paved roads in city settings.

In an example, the processing circuitry is configured to group the multiple vehicles 120 into one or more of multiple groups. In an example, the multiple groups are differentiated by make, model, type, size, time, or features. In an example, the type is car or truck. The grouping enables some meta-analysis to compare like-vehicles with like vehicles, or to determine differences between the groups of vehicles. Thus, for example, a safety grade for a first truck may be fairly compared to that of a second truck where trucks generally perform poorly compared to smaller vehicles. Various features may also be used in the grouping, such as antilock brakes, tire size, etc.

The processing circuitry is configured to derive a statistical value from a portion of the parameter measurements 125 in the vehicle data set 130. The statistical value provides a baseline from the parameter measurements 125 from the multiple vehicles 120 to which the performance of the subject vehicle 105 may be compared. In an example, to derive the statistical value given multiple modes of operation for the multiple vehicles 120, the processing circuitry is configured to derive a statistic for each mode of the multiple modes. In an example, the statistic is an average, a mode, a median, a maximum, or a minimum.

In an example, the portion of the parameter measurements 125 includes values from N vehicles across M modes and $p \in P$ parameters. Here, P={acceleration$_{max}$, acceleration$_{max}^{lat}$, brake$_{min}$, brake$_{min}^{lat}$, or response$_{time}$}. In this example, to derive the statistical value, the processing circuitry is configured to sort elements in the portion of the parameter measurements in ascending order for each mode such that $\{|p_1^m| < |p_1^m| < \ldots < |p_N^m|\}$ and m=1, ..., M. In an example, the statistical value, represented as $S_p^m$ for parameter p under an m-th mode, is an average, median, maximum, or minimum across $p_n^m$ where ($1 \leq n \leq N$). Thus, the statistical value is specific to parameter and mode and calculated across the multiple vehicles 120.

The processing circuitry is configured to obtain a measurement 110 from the subject vehicle 105. Here, the measurement 110 corresponds to the portion of the parameter measurements 125 from which the statistical value was derived. In an example, the processing circuitry is configured to observe the subject vehicle 105, probe the subject vehicle 105, or request from the subject vehicle 105 parameter measurements 110 that correspond to the portion of the parameter measurements 125. In an example, given multiple modes, the portion of the parameter measurements 125 and the measurement 110 have the same mode. In an example, when the multiple vehicles are grouped, the subject vehicle and the portion of the parameter measurements 125 correspond to vehicles in one group (e.g., the same group) of the multiple groups.

The processing circuitry is configured to compare the measurement 110 to the statistical value to produce a safety grade 145 for the subject vehicle 105. In an example, to compare the measurement 110 to the statistical value to produce the safety grade 145, the processing circuitry is configured to weight the result of comparing the statistical value to the measurement from the subject vehicle to produce a weighted result and combining the weighted result to other weighted results from other measurements from the subject vehicle 105 and other statistical values of other modes of the subject vehicle to produce the safety grade. This is illustrated in the calculation of the weighted result under one mode 135 and the calculation of multiple weighted results under all modes under consideration 140.

In an example, the safety grade 145 pertains to one of a safe longitudinal distance or a safe lateral distance from the VOSM. In an example, the safe longitudinal distance is calculated as:

$$d_{min} = \left[ v_r \rho + \frac{1}{2} \alpha_{max,accel} \rho^2 + \frac{(v_r + \rho \alpha_{max,accel})^2}{2\alpha_{min,brake}} - \frac{v_f^2}{2\alpha_{max,brake}} \right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle 105 following a second vehicle and $v_f^2$, and $\alpha_{max,brake}$, are respectively velocity and maximum braking rate for the second vehicle. In an example, the portion of the parameter measurements 125 used to calculate the statistical value include $\alpha_{max,accel}$, $\alpha_{min,brake}$, or $\rho$.

In an example, the safe lateral distance is calculated as:

$$d_{min} = \mu + \left[ \frac{2v_1 + \rho_1 \alpha_{1,max,accel}^{lat}}{2} \rho_1 + \frac{(v_1 + \rho_1 \alpha_{1,max,accel}^{lat})^2}{2\alpha_{1,min,brake}^{lat}} - \frac{2v_2 - \rho_2 \alpha_{2,max,accel}^{lat}}{2} \rho_2 - \frac{(v_2 + \rho_2 \alpha_{2,max,accel}^{lat})^2}{2\alpha_{2,min,brake}^{lat}} \right]_+$$

where $v$ is velocity, $\rho$ is response time, $\alpha^{lat}$ is lateral change in braking or acceleration at either a maximum or a minimum as specified by the subscript, and where the subscript one refers to the subject vehicle 105 and the subscript two refers to a second vehicle. Thus, $v_1$ refers to the velocity of the subject vehicle 105 and $v_2$ refers to the velocity of the second vehicle, and $\alpha_{1,max,accel}^{lat}$ is the maximum lateral acceleration of the subject vehicle 105. In an example, the portion of the parameter measurements used to calculate the statistical value include $\alpha_{1,max,accel}^{lat}$, $\alpha_{1,min,brake}^{lat}$, or $\rho_1$.

In an example, to compare the measurement 110 to the statistical value to produce the safety grade 145 for the subject vehicle 105, the processing circuitry is configured to compute $G_p^m$ as follows:

$$G_p^m = \begin{cases} \frac{|p^m|}{|S_p^m|}, & p \in \{acceleration_{max}, acceleration_{max}^{lat}, response_{time}\} \\ \frac{|S_p^m|}{|p^m|}, & p \in \{brake_{min}, brake_{min}^{lat}, or\ response_{time}\} \end{cases}$$

where $G_p^m$ is calculated for each parameter p and mode m, and p is from the subject vehicle 105. In an example, to compare the measurement 110 to the statistical value to produce the safety grade 145 for the subject vehicle 105, the processing circuitry is configured to compute $G^m$ as follows:

$$G^m = \sum_{p \in P} w_p G_p^m + b$$

where $G^m$ is calculated for each mode m, $w_p$ is a weight for parameter p, and b is a configurable bias value. In an example, to compare the measurement 110 to the statistical value to produce the safety grade 145 for the subject vehicle 105, the processing circuitry is configured to compute G as follows:

$$G = \sum_{m=1}^{M} \omega^m G^m$$

where G is the safety grade 145 for the subject vehicle 105 across all parameters and modes.

The processing circuitry is configured to output the safety grade 145 for the subject vehicle 105 is output. Here, the safety grade 145 is displayed, transmitted, or otherwise communicated to an external party of the system 115, collectively called a consumer 150.

FIG. 2 illustrates an example of a moving vehicle scenario demonstrating an autonomous VOSM, according to an embodiment. As illustrated, a subject vehicle 205 shares the road with two other vehicles, the sedan 220 and the truck 225.

In general, a VOSM is a mathematical model for safety assurance during automatous driving. It formulates a set of safety standards, such as a minimum distance $d_{min}$ between vehicles to avoid collisions. Multiple parameters are used to calculate the formulation, such as response time $\rho$, minimum braking $\alpha_{min,brake}$ and maximum acceleration $\alpha_{max,brake}$ of the vehicle. If all requirements are satisfied, the vehicle passes the VOSM and is believed to be safe, otherwise the vehicle is not safe.

VOSMs may define a safe longitudinal distance 210 and a safe lateral distance 215 for the subject vehicle 205. These distances create a zone, shell, bubble, or shield around the subject vehicle 205, also illustrated around the sedan 220 and the truck 225. Generally, violation of these safe distances (e.g., intersection or overlap 230) indicates that the subject vehicle 205 is not safe and should take corrective action. Note that the intersection 230 need not result in a collision, merely that, according to the VOSM, dangerous situation has arisen.

In an example, the VOSM may use the following representations of safe longitudinal and lateral distances respectively:

$$d_{min} = \left[v_r \rho + \frac{1}{2}a_{max,accel}\rho^2 + \frac{(v_r + \rho a_{max,accel})^2}{2a_{min,brake}} - \frac{v_f^2}{2a_{max,brake}}\right]_+ \quad (1)$$

and $$d_{min} = \mu + \left[\left(\frac{2v_1 + \rho_1 a_{1,max,accel}^{lat}}{2}\rho_1 + \frac{(v_1 + \rho_1 a_{1,max,accel}^{lat})^2}{2a_{1,min,brake}^{lat}}\right) - \left(\frac{2v_2 - \rho_2 a_{2,max,accel}^{lat}}{2}\rho_2 - \frac{(v_2 - \rho_2 a_{2,max,accel}^{lat})^2}{2a_{2,min,brake}^{lat}}\right)\right]_+ \quad (2)$$

With respect to the safe longitudinal distance of equation (1), $\alpha_{max,accel}$ and $\alpha_{min,brake}$ are the maximum acceleration rate and minimum braking rate of the subject vehicle 205 ($c_r$), and $\rho$ is the response time of the subject vehicle 205. With respect to the safe lateral distance of equation (2), $\rho_1$ and $\rho_2$ are the response time of the subject vehicle 205 ($c_1$) and another vehicle ($c_2$) such as the truck 225. Also, $\alpha_{1,max,accel}^{lat}$ and $\alpha_{1,min,brake}^{lat}$ are respectively the maximum acceleration rate and minimum braking rate of $c_1$, $\alpha_{2,max,accel}^{lat}$ and $\alpha_{2,min,brake}^{lat}$ are respectively the maximum acceleration rate and minimum braking rate of $c_2$.

For clarity, the result from equation (1) is referred to as the minimum safe longitudinal distance and the result from equation (2) is referred to as the minimum safe lateral distance. When the subject vehicle 205 detects that it is closer than either the minimum safe longitudinal distance or the minimum safe lateral distance to the truck 225 (or another vehicle), the subject vehicle 205 is expected to implement a corrective action. Such corrective actions may include braking or turning to increase the distance between the subject vehicle 205 and the truck 225 or other object until the minimum safe longitudinal distance and the minimum safe lateral distance are restored.

Equations (1) and (2) above illustrate the parameterization of the safety model to response times of the subject vehicle 205 and the truck 225, maximum lateral or longitudinal acceleration of the truck 225 and minimum braking (e.g., deceleration) of the subject vehicle 205. Here, maximum acceleration is the greatest acceleration capable by a vehicle and minimum braking is the deacceleration a vehicle can guarantee will be applied when executing a maneuver. Thus, if the vehicle is in peak operating condition, the maximum and minimum braking may be the same. However, if, for example, the subject vehicle 205 has worn brakes, the minimum braking for the subject vehicle 205 is reduced from the maximum braking based on the brake wear. Actual values used for the maximum and minimum or either braking or acceleration are generally defined by a manufacturer of the subject vehicle 205, or defined by the VOSM, among other places. These values are defined to provide a realistic safety margin given equations (1) and (2). It is noted that the equations (1) and (2) generally assume a worst case scenario in which the subject vehicle 205 is underperforming (thus the use of the minimum braking for the subject vehicle 205) and the truck 225 is at peak performance (thus the use of maximum acceleration for the truck 225) even though it is more likely that the subject vehicle 205 will outperform its minimum braking and the truck 225 will underperformed its maximum acceleration.

By using the equations (1) and (2), the danger zone is defined around the subject vehicle 205. As noted above, when another object interferes with this zone, or is projected to interfere with the zone, then the subject vehicle 205 is expected to act. Because the velocities of both the subject vehicle 205 and the truck 225 are parameters of equations (1) and (2), the danger zone is constantly changing based on the detected movement of the subject vehicle 205 and the truck 225.

Following the arrangement illustrated in FIG. 1, a vehicle dataset is collected and updated from time to time from operating vehicles, or other tested vehicles. For each vehicle in the dataset, VOSM parameters are measured under each of several modes—e.g., raining mode, city road mode, etc. The number and type of modes are defined aspects of a testing system.

Under each mode, statistical VOSM parameter values are calculated. For example, the average value of $\alpha_{max,brake}$ among all vehicles or among a certain group of vehicles— e.g., if the target vehicle 205 is a van, the statistics may be computed among only vans—are calculated.

The VOSM parameters may be split into two groups. For example, the first group may be highly related to a given driving strategy (e.g., aggressive on a city street and conservative on a dirt road) while the second group is not related to the driving strategy. Generally, only the safety parameters that align with the first group are used to measure the safety grade.

For the vehicle under evaluation, one or more (e.g., each or fewer) VOSM parameters are given a safety grade by comparison with the statistics computed from the vehicle data set. In an example, under each mode, a mode-aware VOSM grade is calculated by a weighted sum of all parameter safety grades. A comprehensive VOSM grade then may be calculated by weighted sum of all modes.

The following two cases provides example calculations of the safety grade: 1. Safe longitudinal distance—same direction; and 2. Safe Lateral Distance. Case 1: Safe longitudinal distance—same direction, the longitudinal distance between a vehicle $c_r$ (e.g., subject vehicle 205) that drives behind another vehicle $c_f$ (e.g., truck 225), where both vehicles are driving in the same direction. the safety standard for $c_r$ may be defined as:

$$d_{min} = \left[ v_r \rho + \frac{1}{2} a_{max,accel} \rho^2 + \frac{(v_r + \rho a_{max,accel})^2}{2 a_{min,brake}} - \frac{v_f^2}{2 a_{max,brake}} \right]_+ \quad (1)$$

where $\alpha_{max,accel}$ and $\alpha_{min,brake}$ are the maximum acceleration rate and minimum braking rate of $c_r$, and $\rho$ is the response time of $c_r$. Here, the vehicle $c_r$ is the vehicle under evaluation whose VOSM grade will be measured.

Case 2: Safe Lateral Distance, the lateral distance between vehicles $c_1$ (e.g., the subject vehicle 205), $c_2$ (e.g., the truck 225) moving with lateral velocities $v_1$, $v_2$. The VOSM safety standard—assuming that $c_1$ is to the left of $c_2$ (as illustrated in FIG. 2)—for $c_1$ may be defined as:

$$d_{min} = \mu + \left[ \frac{2v_1 + \rho_1 a_{1,max,accel}^{lat}}{2} \rho_1 + \frac{(v_1 + \rho_1 a_{1,max,accel}^{lat})^2}{2 a_{1,min,brake}^{lat}} - \left( \frac{2v_2 - \rho_2 a_{2,max,accel}^{lat}}{2} \rho_2 - \frac{(v_2 - \rho_2 a_{2,max,accel}^{lat})^2}{2 a_{2,min,brake}^{lat}} \right) \right]_+ \quad (2)$$

where $\rho_1$ and $\rho_2$ are the response time of $c_1$ and $c_2$, $\alpha_{1,max,accel}^{lat}$ and $\alpha_{1,min,brake}^{lat}$ are the maximum acceleration rate and minimum braking rate of $c_1$, $\alpha_{2,max,accel}^{lat}$ and $\alpha_{2,min,brake}^{lat}$ are the maximum acceleration rate and minimum braking rate of $c_2$, respectively. Here, the vehicle $c_1$ is the vehicle under evaluation whose VOSM grade will be measured.

The parameters in equations (1) and (2) may be divided into two groups, driving strategy parameters and other parameters. The driving strategy parameters reflect the driving strategy of the vehicle under evaluation ($c_r$ in equation (1) and $c_1$ in equation (2)) and include $\rho$, $\alpha_{max,accel}$, $\rho^2$, $\alpha_{min,brake}$, $\rho_1$, $\alpha_{1,max,accel}^{lat}$, and $\alpha_{1,min,brake}^{lat}$. The other (e.g., non-driving strategy) parameters are either from another vehicle than that under evaluation or are not related to a safety grade for the vehicle under evaluation. The other parameters include $v_r$, $v_f^r$, $\alpha_{max,brake}$, $\mu$, $v_1$, $v_2$, $\rho_2$, $\rho_2 \alpha_{2,max,accel}^{lat}$, an $\alpha_{2,min,brake}^{lat}$.

Considering the driving strategy parameters, an example of aggressive strategies may include large $\alpha_{min,brake}$ values and small $\alpha_{max,accel}$ values that result in a small $d_{min}$ based on (1). In contrast conservative strategies will likely result in a greater $d_{min}$, all else being equal. Thus, different choices for the driving strategy parameters will likely result in different safety grades. Accordingly, the safety grade is measured for each driving strategy parameter $p \in P$ based on the statistics computed from the vehicle data set. Here, $P = \{\alpha_{max,accel}, \alpha_{min,brake}, \rho\}$ for case 1 and $P = \{\alpha_{1,max,accel}^{lat}, \alpha_{1,min,brake}^{lat}, \rho_1\}$ for case 2. Any number of techniques may be used to measure the value for each parameter $p \in P$.

A vehicle dataset may be built in which all vehicle variations are contained. Vehicle variations may include different manufactures, different brands, different types, etc. The dataset is optionally grouped by vehicle types (e.g., trucks, cars, sport utility vehicles, etc.). The statistics may be calculated within each group or with all vehicles, under different modes. Again, mode refers to different driving conditions, such as different weather or road types. For example, if there are M modes, then up to M modes may be considered. The parameters under the m-th mode are denoted as $p^m$ and $p \in P$. If N vehicles are sampled for the statistics and the absolute parameter values are sorting in ascending order, then $\{|p_1^m| < |p_1^m| < \ldots < |p_N^m|\}$. Here, $S_p^m$ represents the statistical value of the parameter p under the m-th mode. $S_p^m$ may be any of the average, the median, the mode, the maximum, or the minimum, $p_n^m (1 \le n \le N)$ values of the N vehicles.

The safety grade under different modes may be different. For example, in rainy days the vehicle may adopt conservative VOSM parameters while on sunny days the vehicle may adopt aggressive parameters. Given a specific mode $m = 1, \ldots M$, each parameter is first measured as noted above. Then, based on the statistics from the vehicle dataset, the safety grade for each parameter is defined as:

$$G_p^m = \begin{cases} \frac{|p^m|}{|S_p^m|}, & p \in \{a_{max,accel}, \rho, a_{1,max,accel}^{lat}, \rho_1\} \\ \frac{|S_p^m|}{|p^m|}, & p \in \{a_{min,brake}, a_{1,min,brake}^{lat}, \rho\} \end{cases} \quad (3)$$

Where $p^m$ is the parameter value of the vehicle under evaluation under the m-th mode, and $S_p^m$ is the statistical value from the dataset under the m-th mode. For the vehicle under evaluation, its VOSM grade under the m-th mode $G_{RSS}^m$ is defined as the linear functions of all parameter safeties:

$$G_{VOSM}^m = \sum_{p \in P} w_p G_p^m + b \quad (4)$$

where $w_p$ is the weight for each parameter, and b is an optional bias. For example, cars may have a higher bias than trucks to illustrate that cars are generally safer than trucks due to, for example, smaller masses or more effective brakes.

The comprehensive VOSM grade considers all possible modes. The measure of the general safety capability among all modes may be defined by:

$$G_{VOSM} = \Sigma_{m=1}^{M} \omega^m G_{VOSM}^m \quad (5)$$

where $\omega^m$ is the mode weight as defined by the system (e.g., established by system designers, experts, etc.). Different vehicle types may generally have different weights. For example, cars usually run on city roads while all-terrain vehicles (ATVs) frequently operate on dirt or mountain roads. Thus, when the m-th situation represents a mountain road, cars will generally have smaller value of $\omega^m$ than ATVs. Again, the modes and the weights are system parameters established by system designers.

Figure 3:
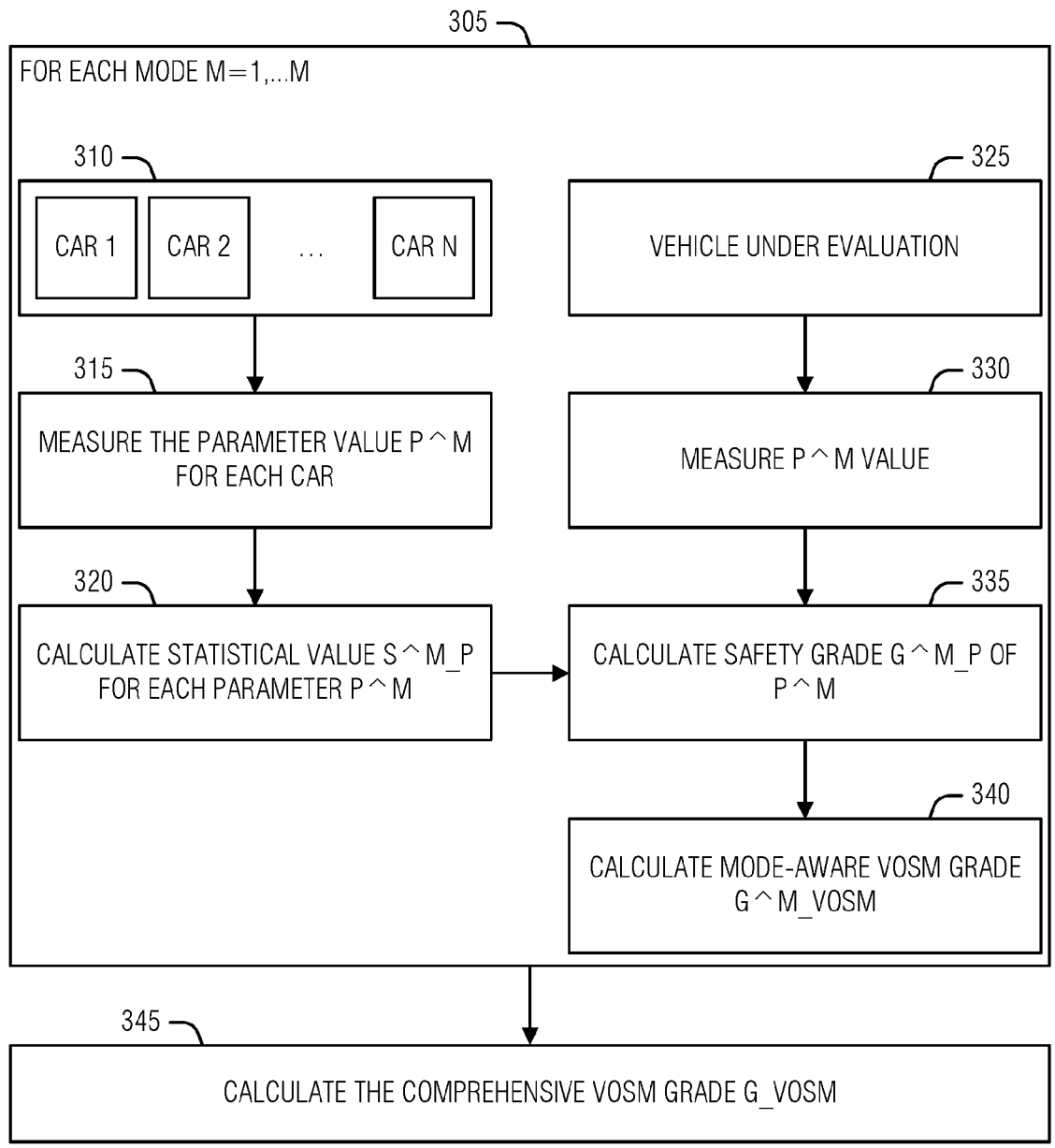
FIG. 3 illustrates an example of a process flow for VOSM grade measurement by statistical parameter analysis, according to an embodiment.

FIG. 3 illustrates an example of a process flow for VOSM grade measurement by statistical parameter analysis, according to an embodiment. The illustrated example is a process flow uses the discussion from FIG. 2 above. For example, using the safe longitudinal distance use case, three parameters are considered: $p \in \{\alpha_{max,accel}, \alpha_{min,brake}, \rho\}$. If N cars are sampled in the vehicle dataset for statistics. For each car in the dataset (loop 310) at each mode (loop 305), the parameter value $p^m$ is measured (operation 315) and the statistical value $S_p^m$ (operation 320) of the N cars is calculated. Again, $S_p^m$ may represent any statistical result, such as median, mode, average (e.g., mean), maximum, minimum, etc.

The parameter values for the car under evaluation (identification 325) are measured (operation 330) and the safety grade of each parameter is calculated (operation 335), for example, by using equation (3). A mode-aware VOSM grade is calculated (operation 340), for example, using equation (4). The safety grade for parameter $p \in P$ under the m-th situation may be denoted as $G_p^m$, and the VOSM grade under the m-th situation is denoted as $G_{VOSM}^m$. The comprehensive VOSM grade may then be computed across modes (operation 345), for example, using equation (5).

In an example, given three parameters $p \in \{\alpha_{max,accel}, \alpha_{min,brake}, \rho\}$ and M situations (e.g., modes), the safety grade of each parameter $G_p^m$ is calculated as in the following Table 1, to form a matrix A. Given the parameter weights $w = [w_{\alpha_{max,accel}}, w_{\alpha_{min,brake}}, w_\rho]$ and the situation weights $\omega = [\omega^1, \omega^2, \ldots, \omega^M]$, the situation specific VOSM grade may be calculated by:

$$[G_{VOSM}^1, G_{VOSM}^2, \ldots, G_{VOSM}^M] = wA \quad (6)$$

The comprehensive VOSM grade is calculated by:

$$G_{RSS} = wA\omega^T \quad (7)$$

| A | Situation 1: Straight City Road Sunny Day | Situation 2: Mountain Road Sunny Day | ... | Situation M: Curving City Road Rainy Day |
|---|---|---|---|---|
| $a_{max, accel}$ | $G_{a_{max, accel}}^1$ | $G_{a_{max, accel}}^2$ | ... | $G_{a_{max, accel}}^M$ |
| $a_{min, brake}$ | $G_{a_{min, brake}}^1$ | $G_{a_{min, brake}}^2$ | ... | $G_{a_{min, brake}}^M$ |
| $\rho$ | $G_\rho^1$ | $G_\rho^2$ | ... | $G_\rho^M$ |

Figure 4:
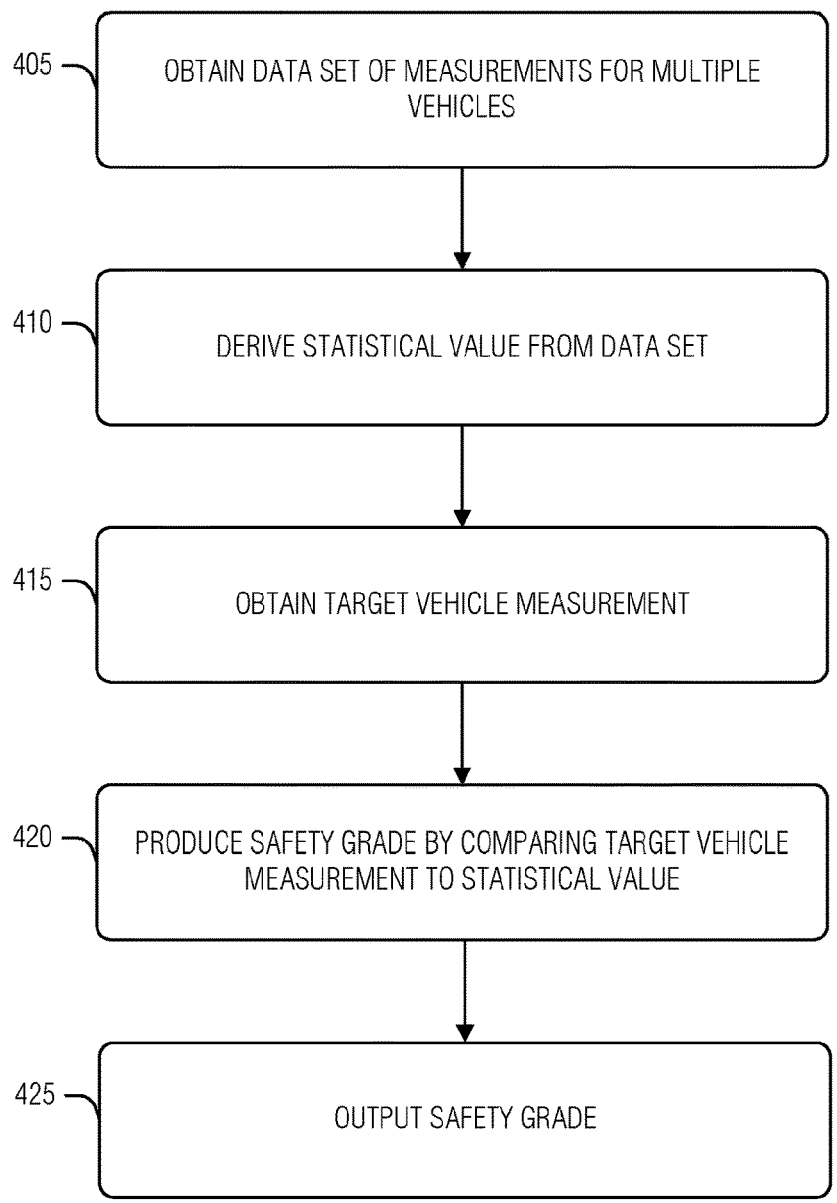
FIG. 4 illustrates an example of a method for VOSM grade measurement, according to an embodiment.

FIG. 4 illustrates an example of a method 400 for VOSM grade measurement, according to an embodiment. The operations of the method 400 are performed by computer hardware, such as that described above or below (e.g., processing circuitry).

At operation 405, a data set of measurements of multiple vehicles is obtained. In an example, the measurements in the data set are defined by a VOSM. In an example, the data set of measurements include multiple modes of operation for the multiple vehicles. In an example, the modes include weather, time, or density. In an example, the weather includes clear, overcast, rain, sleet, or snow. In an example, the time includes morning, day, evening, or night. In an example, the density includes undeveloped, rural, residential, or city.

In an example, the multiple vehicles are grouped into multiple groups. In an example, the multiple groups are differentiated by make, model, type, size, time, or features. In an example, the type is car or truck.

At operation 410, a statistical value is derived from a portion of the parameter measurements. In an example, deriving the statistical value from the portion of the parameter measurements includes deriving a statistic for each mode of the multiple modes. In an example, the statistics an average, a median, a maximum, or a minimum.

In an example, the portion of the parameter measurements includes values from N vehicles across M modes and $p \in P$ parameters. Here, $P = \{acceleration_{max}, acceleration_{max}^{lat}, brake_{min}, brake_{min}^{lat}, or\ response_{time}\}$. In this example, deriving the statistical value from a portion of the parameter measurements includes sorting elements in the portion of the parameter measurements in ascending order for each mode such that $\{|p_1^m| \leq |p_1^m| \leq \ldots \leq |p_N^m|\}$ and $m=1, \ldots, M$. In an example, the statistical value, represented as $S_p$ for parameter p under an m-th mode, is an average, median, maximum, or minimum across $p_n^m$ where ($1 \leq n \leq N$).

At operation 415, a measurement from the subject vehicle is obtained. Here, the measurement corresponds to the portion of the parameter measurements from which the statistical value was derived. In an example, given multiple modes, the portion of the parameter measurements from operation 410 and the measurement from the subject vehicle have the same mode. In an example, when the multiple vehicles are grouped, the subject vehicle and the portion of the parameter measurements correspond to vehicles in one group (e.g., the same group) of the multiple groups.

At operation 420, the measurement is compared to the statistical value to produce a safety grade for the subject vehicle. In an example, comparing the measurement to the statistical value to produce the safety grade includes weighting the result of comparing the statistical value to the measurement from the subject vehicle to produce a weighted result and combining the weighted result to other weighted results from other measurements from the subject vehicle and other statistical values of other modes of the subject vehicle to produce the safety grade.

In an example, the safety grade pertains to one of a safe longitudinal distance or a safe lateral distance from the VOSM. In an example, the safe longitudinal distance is calculated as:

$$d_{min} = \left[v_r\rho + \frac{1}{2}\alpha_{max,accel}\rho^2 + \frac{(v_r + \rho\alpha_{max,accel})^2}{2\alpha_{min,brake}} - \frac{v_f^2}{2\alpha_{max,brake}}\right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{max,brake}$, are respectively velocity and maximum braking rate for the second vehicle.

In an example, the portion of the parameter measurements (operation 410) include $\alpha_{max,accel}$, $\alpha_{min,brake}$, or $\rho$.

In an example, the safe lateral distance is calculated as:

$$d_{min} = \mu + \left[ \frac{2v_1 + \rho_1 \alpha_{1,max,accel}^{lat}}{2}\rho_1 + \frac{(v_1 + \rho_1 \alpha_{1,max,accel}^{lat})^2}{2\alpha_{1,min,brake}^{lat}} - \frac{2v_2 - \rho_2 \alpha_{2,max,accel}^{lat}}{2}\rho_2 - \frac{(v_2 + \rho_2 \alpha_{2,max,accel}^{lat})^2}{2\alpha_{2,min,brake}^{lat}} \right]_+$$

where v is velocity, $\rho$ is response time, $\alpha^{lat}$ is lateral change in braking or acceleration at either a maximum or a minimum as specified by the subscript, and where the subscript one refers to the subject vehicle and the subscript two refers to a second vehicle. In an example, the portion of the parameter measurements (operation 410) include $\alpha_{1,max,accel}^{lat}$, $\alpha_{1,min,brake}^{lat}$, or $\rho_1$.

In an example, comparing the measurement to the statistical value to produce the safety grade for the subject vehicle includes computing $G_p^m$ as follows:

$$G_p^m = \begin{cases} \frac{|p^m|}{|S_p^m|}, & p \in \{acceleration_{max}, acceleration_{max}^{lat}, response_{time}\} \\ \frac{|S_p^m|}{|p^m|}, & p \in \{brake_{min}, brake_{min}^{lat}, or\ response_{time}\} \end{cases}$$

where $G_p^m$ is calculated for each parameter p and mode m, and p is from the subject vehicle. In an example, comparing the measurement to the statistical value to produce the safety grade for the subject vehicle includes computing $G^m$ as follows:

$$G^m = \sum_{p \in P} w_p G_p^m + b$$

where $G^m$ is calculated for each mode m, $w_p$ is a weight for parameter p, and b is a configurable bias value. In an example, comparing the measurement to the statistical value to produce the safety grade for the subject vehicle includes computing G as follows:

$$G = \sum_{m=1}^{M} \omega^m G^m$$

where G is the safety grade for the subject vehicle across all parameters and modes.

At operation 425, the safety grade for the subject vehicle is output.

Figure 5:
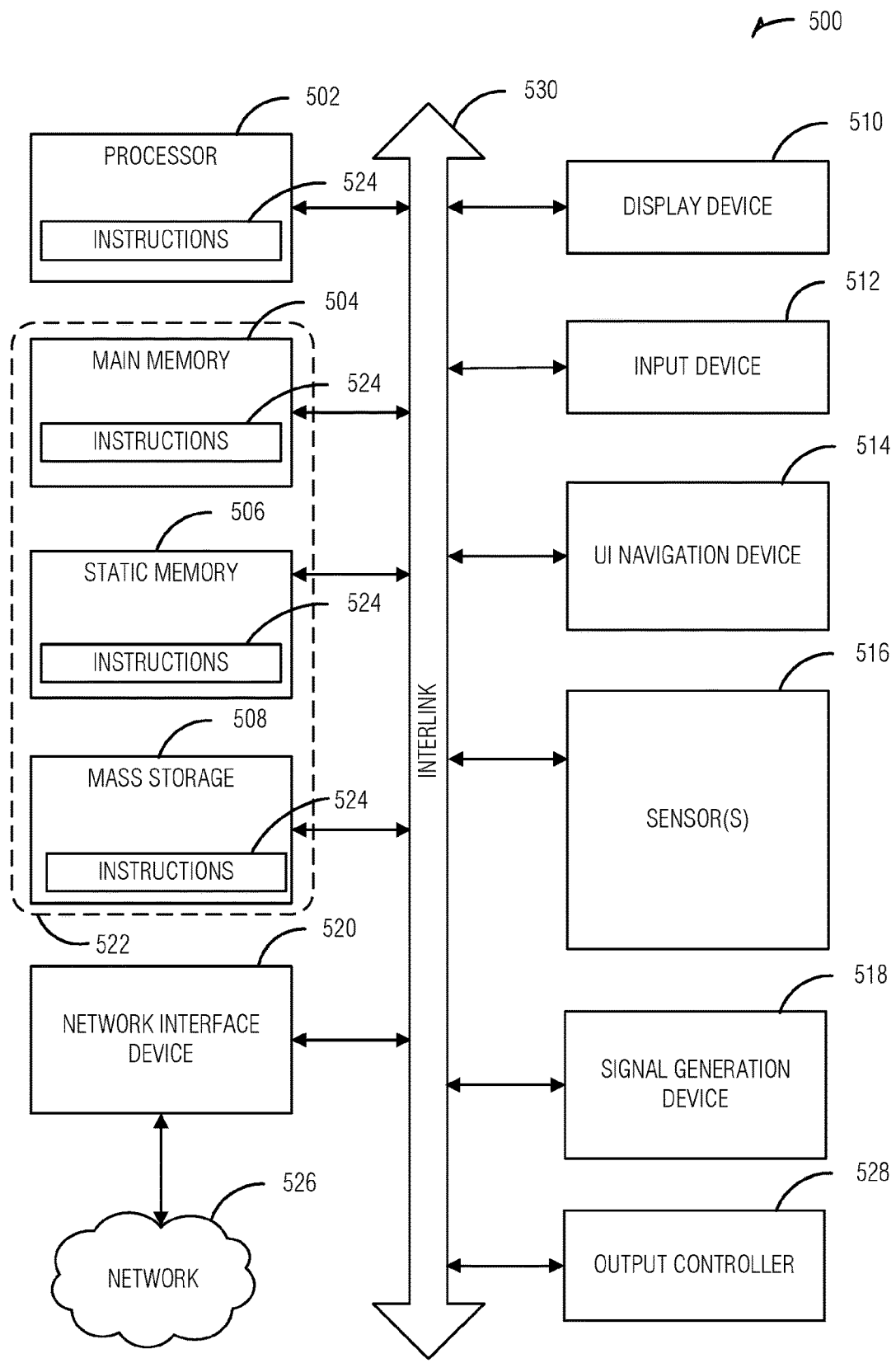
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a apparatus for vehicle operation safety model grade measurement, the apparatus comprising: an interface; a memory including instructions; and processing circuitry that, when in operation, is configured by the instructions to: obtain, via the interface, a data set of parameter measurements of multiple vehicles, the parameter measurements defined by a vehicle operation safety model; derive a statistical value from a portion of the parameter measurements; obtain, via the interface, a measurement from a subject vehicle, the measurement corresponding to the portion of the parameter measurements from which the statistical value was derived; compare the measurement to the statistical value to produce a safety grade for the subject vehicle; and output the safety grade for the subject vehicle.

In Example 2, the subject matter of Example 1 includes, wherein the data set of parameter measurements include multiple modes of operation for the multiple vehicles.

In Example 3, the subject matter of Example 2 includes, wherein the multiple modes include weather, time, or density.

In Example 4, the subject matter of Example 3 includes, wherein the weather includes clear, overcast, rain, sleet, or snow.

In Example 5, the subject matter of Examples 3-4 includes, wherein the time includes morning, day, evening, or night.

In Example 6, the subject matter of Examples 3-5 includes, wherein the density includes undeveloped, rural, residential, or city.

In Example 7, the subject matter of Examples 2-6 includes, wherein the portion of the parameter measurements and the measurement from the subject vehicle have a same mode.

In Example 8, the subject matter of Examples 2-7 includes, wherein, to derive the statistical value from the portion of the parameter measurements, the processing circuitry derives a statistic for each mode of the multiple modes.

In Example 9, the subject matter of Example 8 includes, wherein, to compare the measurement to the statistical value to produce the safety grade, the processing circuitry is configured to: weight a result of comparing the statistical value to the measurement from the subject vehicle to produce a weighted result; and combine the weighted result to other weighted results from other measurements from the subject vehicle and other statistical values of other modes of the subject vehicle to produce the safety grade.

In Example 10, the subject matter of Examples 1-9 includes, wherein the multiple vehicles are grouped into multiple groups, and wherein the subject vehicle and the portion of the parameter measurements correspond to vehicles in one group of the multiple groups.

In Example 11, the subject matter of Example 10 includes, wherein the multiple groups are differentiated by make, model, type, size, time, or features.

In Example 12, the subject matter of Example 11 includes, wherein the type is car or truck.

In Example 13, the subject matter of Examples 1-12 includes, wherein the safety grade pertains to one of a safe longitudinal distance or a safe lateral distance from the vehicle operation safety model.

In Example 14, the subject matter of Example 13 includes, wherein the safe longitudinal distance is calculated as:

$$d_{min} = \left[ v_r \rho + \frac{1}{2} \alpha_{max,accel} \rho^2 + \frac{(v_r + \rho \alpha_{max,accel})^2}{2\alpha_{min,brake}} - \frac{v_f^2}{2\alpha_{max,brake}} \right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{max,brake}$, are respectively velocity and ma maximum braking rate for the second vehicle.

In Example 15, the subject matter of Example 14 includes, wherein the portion of the safety measurements include $\alpha_{max,accel}$, $\alpha_{min,brake}$, or $\rho$.

In Example 16, the subject matter of Examples 13-15 includes, wherein the safe lateral distance is calculated as:

$$d_{min} = \mu + \left[ \frac{2v_1 + \rho_1 \alpha_{1,max,accel}^{lat}}{2} \rho_1 + \frac{(v_1 + \rho_1 \alpha_{1,max,accel}^{lat})^2}{2\alpha_{1,min,brake}^{lat}} - \frac{2v_2 - \rho_{2\alpha_{2,max,accel}^{lat}}}{2} \rho_2 - \frac{(v_2 + \rho_2 \alpha_{2,max,accel}^{lat})^2}{2\alpha_{2,min,brake}^{lat}} \right]_+$$

where $v$ is velocity, $\rho$ is response time, $\alpha^{lat}$ is lateral change in braking or acceleration at either a maximum or a minimum as specified by the subscript, and where the subscript one refers to the subject vehicle and the subscript two refers to a second vehicle.

In Example 17, the subject matter of Example 16 includes, wherein the portion of the safety measurements include $\alpha_{1,max,accel}^{lat}$, $\alpha_{1,min,brake}^{lat}$, or $\rho_1$.

In Example 18, the subject matter of Examples 1-17 includes, wherein the portion of the safety measurements includes values from N vehicles across M modes and $p \in P$ parameters, wherein P={acceleration$_{max}$, acceleration$_{max}^{lat}$, brake$_{min}$, brake$_{min}^{lat}$, or response$_{time}$}, and wherein deriving the statistical value from a portion of the safety measurements includes sorting elements in the portion of the safety measurements in ascending order for each mode such that $\{|p_1^m| < |p_1^m| < \ldots < |p_N^m|\}$, wherein $m=1, \ldots, M$.

In Example 19, the subject matter of Example 18 includes, wherein the statistical value, represented as $S_p^m$ for parameter p under an m-th mode, is an average, median, maximum, or minimum across $p_n^m$ where ($1 \leq n \leq N$).

In Example 20, the subject matter of Example 19 includes, wherein, to compare the measurement to the statistical value to produce a safety grade for the subject vehicle, the processing circuitry is configured to compute $G_p^m$:

$$G_p^m = \begin{cases} \frac{|p^m|}{|S_p^m|}, & p \in \{\text{acceleration}_{max}, \text{acceleration}_{max}^{lat}, \text{response}_{time}\} \\ \frac{|S_p^m|}{|p^m|}, & p \in \{\text{brake}_{min}, \text{brake}_{min}^{lat}, \text{or response}_{time}\} \end{cases}$$

where $G_p^m$ is calculated for each parameter p and mode m, and p is from the subject vehicle.

In Example 21, the subject matter of Example 20 includes, wherein, to compare the measurement to the statistical value to produce a safety grade for the subject vehicle, the processing circuitry is configured to compute $G^m$:

$$G^m = \sum_{p \in P} w_p G_p^m + b$$

where $G^m$ is calculated for each mode m, $w_p$ is a weight for parameter p, and b is a configurable bias value.

In Example 22, the subject matter of Example 21 includes, wherein, to compare the measurement to the statistical value to produce a safety grade for the subject vehicle, the processing circuitry is configured to compute G by:

$$G = \Sigma_{m=1}^M \omega^m G^m$$

where G is the safety grade for the subject vehicle across all parameters and modes.

Example 23 is a method for vehicle operation safety model grade measurement, the method comprising: obtaining a data set of parameter measurements of multiple vehicles, the parameter measurements defined by a vehicle operation safety model; deriving a statistical value from a portion of the parameter measurements; obtaining a measurement from a subject vehicle, the measurement corresponding to the portion of the parameter measurements from which the statistical value was derived; comparing the measurement to the statistical value to produce a safety grade for the subject vehicle; and outputting the safety grade for the subject vehicle.

In Example 24, the subject matter of Example 23 includes, wherein the data set of parameter measurements include multiple modes of operation for the multiple vehicles.

In Example 25, the subject matter of Example 24 includes, wherein the multiple modes include weather, time, or density.

In Example 26, the subject matter of Example 25 includes, wherein the weather includes clear, overcast, rain, sleet, or snow.

In Example 27, the subject matter of Examples 25-26 includes, wherein the time includes morning, day, evening, or night.

In Example 28, the subject matter of Examples 25-27 includes, wherein the density includes undeveloped, rural, residential, or city.

In Example 29, the subject matter of Examples 24-28 includes, wherein the portion of the parameter measurements and the measurement from the subject vehicle have a same mode.

In Example 30, the subject matter of Examples 24-29 includes, wherein deriving the statistical value from the portion of the parameter measurements includes deriving a statistic for each mode of the multiple modes.

In Example 31, the subject matter of Example 30 includes, wherein comparing the measurement to the statistical value to produce the safety grade includes: weighting a result of comparing the statistical value to the measurement from the subject vehicle to produce a weighted result; and combining the weighted result to other weighted results from other measurements from the subject vehicle and other statistical values of other modes of the subject vehicle to produce the safety grade.

In Example 32, the subject matter of Examples 23-31 includes, wherein the multiple vehicles are grouped into multiple groups, and wherein the subject vehicle and the portion of the parameter measurements correspond to vehicles in one group of the multiple groups.

In Example 33, the subject matter of Example 32 includes, wherein the multiple groups are differentiated by make, model, type, size, time, or features.

In Example 34, the subject matter of Example 33 includes, wherein the type is car or truck.

In Example 35, the subject matter of Examples 23-34 includes, wherein the safety grade pertains to one of a safe longitudinal distance or a safe lateral distance from the vehicle operation safety model.

In Example 36, the subject matter of Example 35 includes, wherein the safe longitudinal distance is calculated as:

$$d_{min} = \left[ v_r\rho + \frac{1}{2}\alpha_{max,accel}\rho^2 + \frac{(v_r + \rho\alpha_{max,accel})^2}{2\alpha_{min,brake}} - \frac{v_f^2}{2\alpha_{max,brake}} \right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{max,brake}$, are respectively velocity and ma maximum braking rate for the second vehicle.

In Example 37, the subject matter of Example 36 includes, wherein the portion of the safety measurements include $\alpha_{max,accel}$, $\alpha_{min,brake}$, or $\rho$.

In Example 38, the subject matter of Examples 35-37 includes, wherein the safe lateral distance is calculated as:

$$d_{min} = \mu + \left[ \frac{2v_1 + \rho_1\alpha_{1,max,accel}^{lat}}{2}\rho_1 + \frac{(v_1 + \rho_1\alpha_{1,max,accel}^{lat})^2}{2\alpha_{1,min,brake}^{lat}} - \frac{2v_2 - \rho_2\alpha_{2,max,accel}^{lat}}{2}\rho_2 - \frac{(v_2 + \rho_2\alpha_{2,max,accel}^{lat})^2}{2\alpha_{2,min,brake}^{lat}} \right]_+$$

where $v$ is velocity, $\rho$ is response time, $\alpha^{lat}$ is lateral change in braking or acceleration at either a maximum or a minimum as specified by the subscript, and where the subscript one refers to the subject vehicle and the subscript two refers to a second vehicle.

In Example 39, the subject matter of Example 38 includes, wherein the portion of the safety measurements include $\alpha_{1,max,accel}^{lat}$, $\alpha_{1,min,brake}^{lat}$, or $\rho_1$.

In Example 40, the subject matter of Examples 23-39 includes, wherein the portion of the safety measurements includes values from N vehicles across M modes and $p \in P$ parameters, wherein P={acceleration$_{max}$, acceleration$_{max}^{lat}$, brake$_{min}$, brake$_{min}^{lat}$, or response$_{time}$}, and wherein deriving the statistical value from a portion of the safety measurements includes sorting elements in the portion of the safety measurements in ascending order for each mode such that $\{|p_1^m| < |p_1^m| < \ldots < |p_N^m|\}$, wherein $m = 1, \ldots, M$.

In Example 41, the subject matter of Example 40 includes, wherein the statistical value, represented as $S_p^m$ for parameter p under an m-th mode, is an average, median, maximum, or minimum across $p_n^m$ where ($1 \le n \le N$).

In Example 42, the subject matter of Example 41 includes, wherein comparing the measurement to the statistical value to produce a safety grade for the subject vehicle includes computing $G_p^m$:

$$G_p^m = \begin{cases} \frac{|p^m|}{|S_p^m|}, & p \in \{\text{acceleration}_{max}, \text{acceleration}_{max}^{lat}, \text{response}_{time}\} \\ \frac{|S_p^m|}{|p^m|}, & p \in \{\text{brake}_{min}, \text{brake}_{min}^{lat}, \text{or response}_{time}\} \end{cases}$$

where $G_p^m$ is calculated for each parameter p and mode m, and p is from the subject vehicle.

In Example 43, the subject matter of Example 42 includes, wherein comparing the measurement to the statistical value to produce a safety grade for the subject vehicle includes computing $G^m$:

$$G^m = \sum_{p \in P} w_p G_p^m + b$$

where $G^m$ is calculated for each mode m, $w_p$ is a weight for parameter p, and b is a configurable bias value.

In Example 44, the subject matter of Example 43 includes, wherein comparing the measurement to the statistical value to produce a safety grade for the subject vehicle includes computing G by:

$$G = \Sigma_{m=1}^M \omega^m G^m$$

where G is the safety grade for the subject vehicle across all parameters and modes.

Example 45 is a machine readable medium including instructions for vehicle operation safety model grade measurement, the instructions, when executed by processing circuitry, cause the processing circuitry to perform operations comprising: obtaining a data set of parameter measurements of multiple vehicles, the parameter measurements defined by a vehicle operation safety model; deriving a statistical value from a portion of the parameter measurements; obtaining a measurement from a subject vehicle, the measurement corresponding to the portion of the parameter measurements from which the statistical value was derived; comparing the measurement to the statistical value to produce a safety grade for the subject vehicle; and outputting the safety grade for the subject vehicle.

In Example 46, the subject matter of Example 45 includes, wherein the data set of parameter measurements include multiple modes of operation for the multiple vehicles.

In Example 47, the subject matter of Example 46 includes, wherein the multiple modes include weather, time, or density.

In Example 48, the subject matter of Example 47 includes, wherein the weather includes clear, overcast, rain, sleet, or snow.

In Example 49, the subject matter of Examples 47-48 includes, wherein the time includes morning, day, evening, or night.

In Example 50, the subject matter of Examples 47-49 includes, wherein the density includes undeveloped, rural, residential, or city.

In Example 51, the subject matter of Examples 46-50 includes, wherein the portion of the parameter measurements and the measurement from the subject vehicle have a same mode.

In Example 52, the subject matter of Examples 46-51 includes, wherein deriving the statistical value from the portion of the parameter measurements includes deriving a statistic for each mode of the multiple modes.

In Example 53, the subject matter of Example 52 includes, wherein comparing the measurement to the statistical value to produce the safety grade includes: weighting a result of comparing the statistical value to the measurement from the subject vehicle to produce a weighted result; and combining the weighted result to other weighted results from other measurements from the subject vehicle and other statistical values of other modes of the subject vehicle to produce the safety grade.

In Example 54, the subject matter of Examples 45-53 includes, wherein the multiple vehicles are grouped into multiple groups, and wherein the subject vehicle and the portion of the parameter measurements correspond to vehicles in one group of the multiple groups.

In Example 55, the subject matter of Example 54 includes, wherein the multiple groups are differentiated by make, model, type, size, time, or features.

In Example 56, the subject matter of Example 55 includes, wherein the type is car or truck.

In Example 57, the subject matter of Examples 45-56 includes, wherein the safety grade pertains to one of a safe longitudinal distance or a safe lateral distance from the vehicle operation safety model.

In Example 58, the subject matter of Example 57 includes, wherein the safe longitudinal distance is calculated as:

$$d_{min} = \left[ v_r \rho + \frac{1}{2} \alpha_{max,accel} \rho^2 + \frac{(v_r + \rho \alpha_{max,accel})^2}{2\alpha_{min,brake}} - \frac{v_f^2}{2\alpha_{max,brake}} \right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{max,brake}$, are respectively velocity and ma maximum braking rate for the second vehicle.

In Example 59, the subject matter of Example 58 includes, wherein the portion of the safety measurements include $\alpha_{max,accel}$, $\alpha_{min,brake}$, or $\rho$.

In Example 60, the subject matter of Examples 57-59 includes, wherein the safe lateral distance is calculated as:

$$d_{min} = \mu + \left[ \frac{2v_1 + \rho_1 \alpha_{1,max,accel}^{lat}}{2} \rho_1 + \frac{(v_1 + \rho_1 \alpha_{1,max,accel}^{lat})^2}{2\alpha_{1,min,brake}^{lat}} - \frac{2v_2 - \rho_2 \alpha_{2,max,accel}^{lat}}{2} \rho_2 - \frac{(v_2 + \rho_2 \alpha_{2,max,accel}^{lat})^2}{2\alpha_{2,min,brake}^{lat}} \right]_+$$

where $v$ is velocity, $\rho$ is response time, $\alpha^{lat}$ is lateral change in braking or acceleration at either a maximum or a minimum as specified by the subscript, and where the subscript one refers to the subject vehicle and the subscript two refers to a second vehicle.

In Example 61, the subject matter of Example 60 includes, wherein the portion of the safety measurements include $\alpha_{1,max,accel}^{lat}$, $\alpha_{1,min,brake}^{lat}$, or $\rho_1$.

In Example 62, the subject matter of Examples 45-61 includes, wherein the portion of the safety measurements includes values from N vehicles across M modes and $p \in P$ parameters, wherein P={acceleration$_{max}$, acceleration$_{max}^{lat}$, brake$_{min}$, brake$_{min}^{lat}$, or response$_{time}$}, and wherein deriving the statistical value from a portion of the safety measurements includes sorting elements in the portion of the safety measurements in ascending order for each mode such that $\{|p_1^m| < |p_1^m| < \ldots < |p_N^m|\}$, wherein $m = 1, \ldots, M$.

In Example 63, the subject matter of Example 62 includes, wherein the statistical value, represented as $S_p^m$ for parameter p under an m-th mode, is an average, median, maximum, or minimum across $p_n^m$ where ($1 \leq n \leq N$).

In Example 64, the subject matter of Example 63 includes, wherein comparing the measurement to the statistical value to produce a safety grade for the subject vehicle includes computing $G_p^m$:

$$G_p^m = \begin{cases} \frac{|p^m|}{|S_p^m|}, & p \in \{\text{acceleration}_{max}, \text{acceleration}_{max}^{lat}, \text{response}_{time}\} \\ \frac{|S_p^m|}{|p^m|}, & p \in \{\text{brake}_{min}, \text{brake}_{min}^{lat}, \text{or response}_{time}\} \end{cases}$$

where $G_p^m$ is calculated for each parameter p and mode m, and p is from the subject vehicle.

In Example 65, the subject matter of Example 64 includes, wherein comparing the measurement to the statistical value to produce a safety grade for the subject vehicle includes computing $G^m$:

$$G^m = \sum_{p \in P} w_p G_p^m + b$$

where $G^m$ is calculated for each mode m, $w_p$ is a weight for parameter p, and b is a configurable bias value.

In Example 66, the subject matter of Example 65 includes, wherein comparing the measurement to the statistical value to produce a safety grade for the subject vehicle includes computing G by:

$$G = \Sigma_{m=1}^M \omega^m G^m$$

where G is the safety grade for the subject vehicle across all parameters and modes.

Example 67 is a system for vehicle operation safety model grade measurement, the system comprising: means for obtaining a data set of parameter measurements of multiple vehicles, the parameter measurements defined by a vehicle operation safety model; means for deriving a statistical value from a portion of the parameter measurements; means for obtaining a measurement from a subject vehicle, the measurement corresponding to the portion of the parameter measurements from which the statistical value was derived; means for comparing the measurement to the statistical value to produce a safety grade for the subject vehicle; and means for outputting the safety grade for the subject vehicle.

In Example 68, the subject matter of Example 67 includes, wherein the data set of parameter measurements include multiple modes of operation for the multiple vehicles.

In Example 69, the subject matter of Example 68 includes, wherein the multiple modes include weather, time, or density.

In Example 70, the subject matter of Example 69 includes, wherein the weather includes clear, overcast, rain, sleet, or snow.

In Example 71, the subject matter of Examples 69-70 includes, wherein the time includes morning, day, evening, or night.

In Example 72, the subject matter of Examples 69-71 includes, wherein the density includes undeveloped, rural, residential, or city.

In Example 73, the subject matter of Examples 68-72 includes, wherein the portion of the parameter measurements and the measurement from the subject vehicle have a same mode.

In Example 74, the subject matter of Examples 68-73 includes, wherein the means for deriving the statistical value from the portion of the parameter measurements include means for deriving a statistic for each mode of the multiple modes.

In Example 75, the subject matter of Example 74 includes, wherein the means for comparing the measurement to the statistical value to produce the safety grade include: means for weighting a result of comparing the statistical value to the measurement from the subject vehicle to produce a weighted result; and means for combining the weighted result to other weighted results from other measurements from the subject vehicle and other statistical values of other modes of the subject vehicle to produce the safety grade.

In Example 76, the subject matter of Examples 67-75 includes, wherein the multiple vehicles are grouped into multiple groups, and wherein the subject vehicle and the portion of the parameter measurements correspond to vehicles in one group of the multiple groups.

In Example 77, the subject matter of Example 76 includes, wherein the multiple groups are differentiated by make, model, type, size, time, or features.

In Example 78, the subject matter of Example 77 includes, wherein the type is car or truck.

In Example 79, the subject matter of Examples 67-78 includes, wherein the safety grade pertains to one of a safe longitudinal distance or a safe lateral distance from the vehicle operation safety model.

In Example 80, the subject matter of Example 79 includes, wherein the safe longitudinal distance is calculated as:

$$d_{min} = \left[ v_r \rho + \frac{1}{2}\alpha_{max,accel}\rho^2 + \frac{(v_r + \rho\alpha_{max,accel})^2}{2\alpha_{min,brake}} - \frac{v_f^2}{2\alpha_{max,brake}} \right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{min,brake}$, are respectively velocity and ma maximum braking rate for the second vehicle.

In Example 81, the subject matter of Example 80 includes, wherein the portion of the safety measurements include $\alpha_{max,accel}$, $\alpha_{min,brake}$, or $\rho$.

In Example 82, the subject matter of Examples 79-81 includes, wherein the safe lateral distance is calculated as:

$$d_{min} = \mu + \left[ \frac{2v_1 + \rho_1\alpha_{1,max,accel}^{lat}}{2}\rho_1 + \frac{(v_1 + \rho_1\alpha_{1,max,accel}^{lat})^2}{2\alpha_{1,min,brake}^{lat}} - \frac{2v_2 - \rho_2\alpha_{2,max,accel}^{lat}}{2}\rho_2 - \frac{(v_2 + \rho_2\alpha_{2,max,accel}^{lat})^2}{2\alpha_{2,min,brake}^{lat}} \right]_+$$

where v is velocity, $\rho$ is response time, $\alpha^{lat}$ is lateral change in braking or acceleration at either a maximum or a minimum as specified by the subscript, and where the subscript one refers to the subject vehicle and the subscript two refers to a second vehicle.

In Example 83, the subject matter of Example 82 includes, wherein the portion of the safety measurements include $\alpha_{1,max,accel}^{lat}$, $\alpha_{1,min,brake}^{lat}$, or $\rho_1$.

In Example 84, the subject matter of Examples 67-83 includes, wherein the portion of the safety measurements includes values from N vehicles across M modes and $p \in P$ parameters, wherein P={acceleration$_{max}$, acceleration$_{max}^{lat}$, brake$_{min}$, brake$_{min}^{lat}$, or response$_{time}$}, and wherein deriving the statistical value from a portion of the safety measurements includes sorting elements in the portion of the safety measurements in ascending order for each mode such that $\{|p_1^m|<|p_1^m|< \ldots <|p_N^m|\}$, wherein m=1, ..., M.

In Example 85, the subject matter of Example 84 includes, wherein the statistical value, represented as $S_p^m$ for parameter p under an m-th mode, is an average, median, maximum, or minimum across pin where ($1 \le n \le N$).

In Example 86, the subject matter of Example 85 includes, wherein the means for comparing the measurement to the statistical value to produce a safety grade for the subject vehicle include means for computing $G_p^m$:

$$G_p^m = \begin{cases} \frac{|p^m|}{|S_p^m|}, & p \in \{\text{acceleration}_{max}, \text{acceleration}_{max}^{lat}, \text{response}_{time}\} \\ \frac{|S_p^m|}{|p^m|}, & p \in \{\text{brake}_{min}, \text{brake}_{min}^{lat}, \text{or response}_{time}\} \end{cases}$$

where $G_p^m$ is calculated for each parameter p and mode m, and p is from the subject vehicle.

In Example 87, the subject matter of Example 86 includes, wherein the means for comparing the measurement to the statistical value to produce a safety grade for the subject vehicle include means for computing $G^m$:

$$G^m = \sum_{p \in P} w_p G_p^m + b$$

where $G^m$ is calculated for each mode m, $w_p$ is a weight for parameter p, and b is a configurable bias value.

In Example 88, the subject matter of Example 87 includes, wherein the means for comparing the measurement to the statistical value to produce a safety grade for the subject vehicle include means for computing G by:

$$G = \sum_{m=1}^{M} \omega^m G^m$$

where G is the safety grade for the subject vehicle across all parameters and modes.

Example 89 is at least one machine-readable medium including instructions that, when executed by processing circuitry, cause the processing circuitry to perform operations to implement of any of Examples 1-88.

Example 90 is an apparatus comprising means to implement of any of Examples 1-88.

Example 91 is a system to implement of any of Examples 1-88.

Example 92 is a method to implement of any of Examples 1-88.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for vehicle operation safety model grade measurement, the apparatus comprising:
   an interface;
   a memory including instructions; and
   processing circuitry that, when in operation, is configured by the instructions to:
   obtain, via the interface, a data set of parameter measurements of multiple vehicles, the parameter measurements defined by a vehicle operation safety model, wherein the parameter measurements are used in calculation of one or more of a safe longitudinal distance or a safe lateral distance defined according to the vehicle operation safety model;
   derive a statistical value from a portion of the parameter measurements;
   obtain, via the interface, a measurement from a subject vehicle, the measurement corresponding to the portion of the parameter measurements from which the statistical value was derived;
   compare the measurement to the statistical value to produce a safety grade for the subject vehicle, wherein the safety grade provides a measurement of compliance with the one or more of the safe longitudinal distance or the safe lateral distance defined according to the vehicle operation safety model; and
   output the safety grade for the subject vehicle.

2. The apparatus of claim 1, wherein the data set of parameter measurements include multiple modes of operation for the multiple vehicles.

3. The apparatus of claim 2, wherein the multiple modes include weather, time, or density;
   wherein the weather includes clear, overcast, rain, sleet, or snow;

wherein the time includes morning, day, evening, or night; and wherein the density includes undeveloped, rural, residential, or city.

4. The apparatus of claim 1, wherein the safe longitudinal distance is calculated as:

$$d_{min} = \left[v_r\rho + \frac{1}{2}\alpha_{max,accel}\rho^2 + \frac{(v_r + \rho\alpha_{max,accel})^2}{2\alpha_{min,brake}} - \frac{v_f^2}{2\alpha_{max,brake}}\right]_+$$

where $\alpha_{max,accel}$, $\alpha_{min,brake}$, $v_r$, and $\rho$ are respectively a maximum acceleration rate, a minimum braking rate, a velocity, and a response time for the subject vehicle following a second vehicle and $v_f^2$, and $\alpha_{max,brake}$, are respectively velocity and ma maximum braking rate for the second vehicle; and wherein the portion of the safety measurements include $\alpha_{max,accel}$, $\alpha_{min,brake}$, or $\rho$.

5. The apparatus of claim 1, wherein the safe lateral distance is calculated as:

$$d_{min} = \mu + \left[\frac{2v_1 + \rho_1\alpha_{1,max,accel}^{lat}}{2}\rho_1 + \frac{(v_1 + \rho_1\alpha_{1,max,accel}^{lat})^2}{2\alpha_{1,min,brake}^{lat}} - \frac{2v_2 - \rho_2\alpha_{2,max,accel}^{lat}}{2}\rho_2 - \frac{(v_2 + \rho_2\alpha_{2,max,accel}^{lat})^2}{2\alpha_{2,min,brake}^{lat}}\right]_+$$

where $v$ is velocity, $\rho$ is response time, $\alpha^{lat}$ is lateral change in braking or acceleration at either a maximum or a minimum as specified by the subscript, and where the subscript numeral one refers to the subject vehicle and the subscript numeral two refers to a second vehicle.

6. The apparatus of claim 5 wherein the portion of the safety measurements include $\alpha_{1,max,accel}^{lat}$, $\alpha_{1,min,brake}^{lat}$, or $\rho_1$.

7. The apparatus of claim 2, wherein the portion of the parameter measurements and the measurement from the subject vehicle have a same mode.

8. The apparatus of claim 2, wherein, to derive the statistical value from the portion of the parameter measurements, the processing circuitry derives a statistic for each mode of the multiple modes.

9. The apparatus of claim 8, wherein, to compare the measurement to the statistical value to produce the safety grade, the processing circuitry is configured to:
weight a result of comparing the statistical value to the measurement from the subject vehicle to produce a weighted result; and
combine the weighted result to other weighted results from other measurements from the subject vehicle and other statistical values of other modes of the subject vehicle to produce the safety grade.

10. The apparatus of claim 1, wherein the multiple vehicles are grouped into multiple groups, and wherein the subject vehicle and the portion of the parameter measurements correspond to vehicles in one group of the multiple groups.

11. The apparatus of claim 10, wherein the multiple groups are differentiated by make, model, type, size, time, or features.

12. The apparatus of claim 11, wherein the type is car or truck.

13. The apparatus of claim 1 wherein the portion of the safety measurements includes values from N vehicles across M modes and p∈P parameters, wherein P=(acceleration$_{max}$, acceleration$_{max}^{lat}$, brake$_{min}$, brake$_{min}^{lat}$, or response$_{time}$), and wherein, to derive the statistical value from a portion of the safety measurements, the processing circuitry is configured to sort elements in the portion of the safety measurements in ascending order for each mode such that $\{|p_1^m|<|p_1^m|< \ldots <|p_N^m|\}$, wherein m=1, ..., M.

14. The apparatus of claim 13 wherein the statistical value, represented as $S_p^m$ for parameter p under an m-th mode, is an average, median, maximum, or minimum across $p_n^m$ where (1≤n≤N).

15. The apparatus of claim 14 wherein, to compare the measurement to the statistical value to produce a safety grade for the subject vehicle, the processing circuitry is configured to compute $G_p^m$:

$$G_p^m = \begin{cases} \frac{|p^m|}{|S_p^m|}, & p \in \{\text{acceleration}_{max}, \text{acceleration}_{max}^{lat}, \text{response}_{time}\} \\ \frac{|S_p^m|}{|p^m|}, & p \in \{\text{brake}_{min}, \text{brake}_{min}^{lat}, \text{or response}_{time}\} \end{cases}$$

where $G_p^m$ is calculated for each parameter p and mode m, and p is from the subject vehicle.

16. The apparatus of claim 15 wherein, to compare the measurement to the statistical value to produce a safety grade for the subject vehicle, the processing circuitry is configured to compute $G^m$:

$$G^m = \sum_{p \in P} w_p G_p^m + b$$

where $G^m$ is calculated for each mode m, $w_p$ is a weight for parameter p, and b is a configurable bias value.

17. The apparatus of claim 16 wherein, to compare the measurement to the statistical value to produce a safety grade for the subject vehicle, the processing circuitry is configured to compute G by:

$$G = \Sigma_{m=1}^M \omega^m G^m$$

where G is the safety grade for the subject vehicle across all parameters and modes.

18. A method for vehicle operation safety model grade measurement, the method comprising:
obtaining a data set of parameter measurements of multiple vehicles, the parameter measurements defined by a vehicle operation safety model, wherein the parameter measurements are used in calculation of one or more of a safe longitudinal distance or a safe lateral distance defined according to the vehicle operation safety model;
deriving a statistical value from a portion of the parameter measurements;
obtaining a measurement from a subject vehicle, the measurement corresponding to the portion of the parameter measurements from which the statistical value was derived;
comparing the measurement to the statistical value to produce a safety grade for the subject vehicle, wherein the safety grade provides a measurement of compliance with one or more of the safe longitudinal distance or the safe lateral distance defined according to the vehicle operation safety model; and
outputting the safety grade for the subject vehicle.

19. The method of claim 18, wherein the data set of parameter measurements include multiple modes of operation for the multiple vehicles.

20. The method of claim 19, wherein the multiple modes include weather, time, or density;
- wherein the weather includes clear, overcast, rain, sleet, or snow;
- wherein the time includes morning, day, evening, or night; and
- wherein the density includes undeveloped, rural, residential, or city.

21. The method of claim 19, wherein the portion of the parameter measurements and the measurement from the subject vehicle have a same mode.

22. The method of claim 19, wherein deriving the statistical value from the portion of the parameter measurements includes deriving a statistic for each mode of the multiple modes.

23. The method of claim 22, wherein comparing the measurement to the statistical value to produce the safety grade includes:
- weighting a result of comparing the statistical value to the measurement from the subject vehicle to produce a weighted result; and
- combining the weighted result to other weighted results from other measurements from the subject vehicle and other statistical values of other modes of the subject vehicle to produce the safety grade.

24. The method of claim 18, wherein the multiple vehicles are grouped into multiple groups, and wherein the subject vehicle and the portion of the parameter measurements correspond to vehicles in one group of the multiple groups.

25. The method of claim 24, wherein the multiple groups are differentiated by make, model, type, size, time, or features.

26. The method of claim 25, wherein the type is car or truck.

* * * * *